(12) United States Patent
Hu et al.

(10) Patent No.: US 9,558,221 B2
(45) Date of Patent: Jan. 31, 2017

(54) MULTI-PASS, PARALLEL MERGE FOR PARTITIONED INTERMEDIATE PAGES

(71) Applicants: Joseph Weizhen Hu, Lexington, MA (US); Mei-Lin Lin, Pleasanton, CA (US); Blaine C. French, Concord, MA (US)

(72) Inventors: Joseph Weizhen Hu, Lexington, MA (US); Mei-Lin Lin, Pleasanton, CA (US); Blaine C. French, Concord, MA (US)

(73) Assignee: Sybase, Inc., Dublin, CA (US)

( * ) Notice: Subject to any disclaimer, the term of this patent is extended or adjusted under 35 U.S.C. 154(b) by 328 days.

(21) Appl. No.: 14/079,060

(22) Filed: Nov. 13, 2013

(65) Prior Publication Data

US 2015/0134678 A1 May 14, 2015

(51) Int. Cl.
*G06F 7/00* (2006.01)
*G06F 17/30* (2006.01)
*G06F 13/14* (2006.01)

(52) U.S. Cl.
CPC .............................. *G06F 17/30312* (2013.01)

(58) Field of Classification Search
CPC .............. G06F 17/30445; G06F 17/30498;
G06F 17/3033; G06F 17/30466; G06F
17/30595; G06F 17/30011; G06F
17/30713; G06F 17/30327; G06F
17/30598; G06F 17/303; G06F 17/30336;
G06F 17/30339; G06F 17/3048; G06F
17/30557; G06F 17/30578; G06F
17/30997; G06F 17/3038; G06F
17/30519; G06F 17/30569; G06F
17/30312

USPC ....... 707/714, 713, 698, 747, 696, 737, 825, 707/E17.005, E17.044, 736, E17.002, 707/E17.012, E17.089, 616, 797, E17.01, 707/756

See application file for complete search history.

(56) References Cited

U.S. PATENT DOCUMENTS

| | | | |
|---|---|---|---|
| 5,497,486 A | 3/1996 | Stolfo et al. | |
| 5,640,554 A | 6/1997 | Take | |
| 5,794,229 A | 8/1998 | French et al. | |
| 7,548,898 B1 * | 6/2009 | Tarenskeen et al. | . G06F 17/303 |
| 7,921,132 B2 | 4/2011 | Uppala | |
| 8,266,111 B2 | 9/2012 | Lin et al. | |
| 8,321,420 B1 | 11/2012 | Sinclair et al. | |
| 8,370,316 B2 * | 2/2013 | Bensberg et al. | ... G06F 17/3033 707/696 |
| 8,583,657 B2 | 11/2013 | Shukla | |
| 8,583,692 B2 | 11/2013 | Ganesh et al. | |
| 2006/0218123 A1 | 9/2006 | Chowdhuri et al. | |
| 2008/0120292 A1 * | 5/2008 | Sundaresan et al. | ............. G06F 17/3071 |
| 2009/0100089 A1 | 4/2009 | Eadon et al. | |
| 2011/0302151 A1 | 12/2011 | Abadi et al. | |
| 2012/0221549 A1 | 8/2012 | Weyerhaeuser et al. | |
| 2012/0246158 A1 | 9/2012 | Ke et al. | |
| 2013/0103654 A1 | 4/2013 | McLachlan et al. | |
| 2013/0166557 A1 | 6/2013 | Fricke et al. | |

FOREIGN PATENT DOCUMENTS

EP          2660736 A1    6/2013

* cited by examiner

*Primary Examiner* — Usmaan Saeed
*Assistant Examiner* — Cecile Vo
(74) *Attorney, Agent, or Firm* — Sterne, Kessler, Goldstein & Fox P.L.L.C.

(57) ABSTRACT

Multi-pass parallel merging in a database includes identifying characteristics of non-final pages during database query operations. A phase of page consolidation is triggered based on the identified characteristics and a final page is stored.

19 Claims, 11 Drawing Sheets

MULTI-PASS, PARALLEL MERGE FOR PARTITIONED INTERMEDIATE PAGES

BACKGROUND

Computers are powerful tools for storing and providing access to vast amounts of information. Computer databases are a common mechanism for storing information on computer systems while providing easy access to users. A typical database is an organized collection of related information stored as "records" having "fields" of information. As an example, a business may have a database of employees. The database of employees may have a record for each employee where each record includes fields designating specific properties or information about any employee, such as, but not limited to the employee's name, contact information, and salary.

Between the actual physical database (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, all without user knowledge of the underlying system implementation. In this manner, the DBMS provides users with a conceptual view of the database that is removed from the hardware level. The general construction and operation of database management systems is well known in the art.

Increasingly, businesses run mission-critical systems which store information on database management systems. Each day more and more users base their business operations on mission-critical systems which store information on server-based database systems, such as SAP® Sybase® IQ (available from SAP AG of Delaware). SAP Sybase IQ is an analytics engine based on columnar database architecture, which stores data in columns. IQ is powered with a parallel bulk load engine. For non-partitioned tables, the load engine generates "final pages", which are defined as normal data pages containing contiguous row IDs. Row ID (RID) contiguousness is crucial for fast data retrieval, because a column data projection algorithm used by the system is optimized when a page only includes consecutive row IDs, as opposed to row IDs with gaps. When operating with hash or hash-range partitioned tables, non-contiguousness of row IDs presents query inefficiencies. For a hash or hash-range partitioned tables, a typical page generated by the parallel bulk load engine includes regions of row IDs from different partitions. These pages are referred to as "intermediate pages" (IPs). Intermediate pages result in degraded query performance, because the column data projection algorithm has to constantly jump between different pages.

BRIEF DESCRIPTION OF THE DRAWINGS/FIGURES

The accompanying drawings, which are incorporated herein and form part of the specification, illustrate embodiments of the present invention and, together with the description, further serve to explain the principles of embodiments of the invention and to enable a person skilled in the relevant art(s) to make and use embodiments of the invention.

Figure 1:
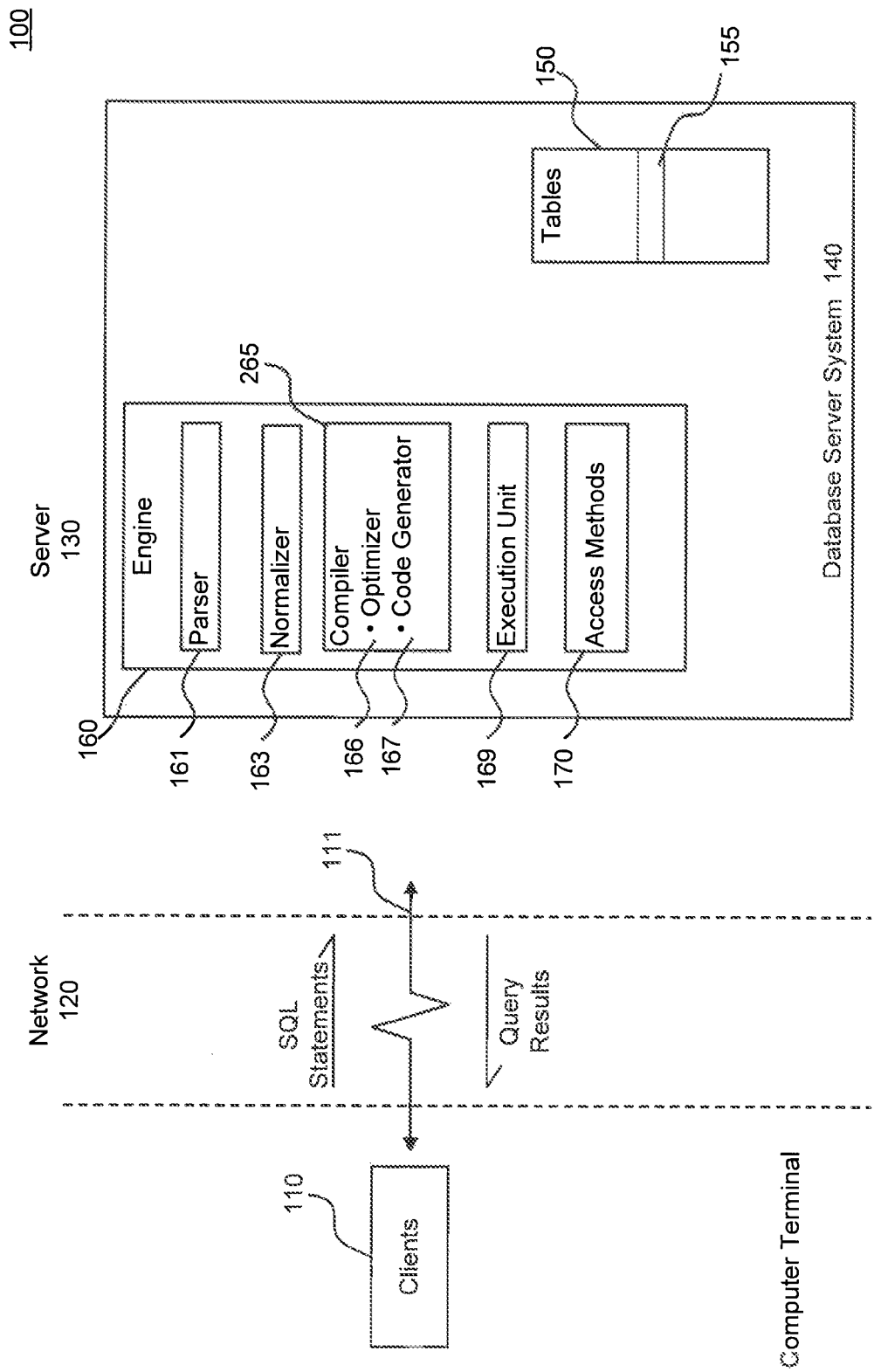
FIG. 1 is an exemplary database computing environment in which embodiments may be implemented.

The features and advantages of embodiments of the invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

FIG. 1 illustrates the general structure of a client/server database system 100 suitable for implementing embodiments. (Specific modifications to the system 100 for implementing other embodiments are described in subsequent sections below.) As shown, the system 100 comprises one or more client computing device(s) 110 connected to a server 130 via a network 120. Specifically, the client computing device(s) 110 comprise one or more standalone terminals connected to a Database Management System 140 ("DBMS") using a network 120. In an exemplary embodiment, the terminals may themselves comprise a plurality of standalone workstations, dumb terminals, or the like, or comprise personal computers (PCs). Typically, such units would operate under a client operating system, such as, but not limited to, a Microsoft® Windows, Unix, Apple®, etc., client operating system The database server system 130, which may comprise SAP® Sybase® IQ (available from SAP) in an exemplary embodiment, generally operates as an independent process (i.e., independently of the client computing devices), running under a server operating system such as, but not limited to, Microsoft® Windows NT, Windows 2000, Windows XP, Windows Vista and Windows 7 (all from Microsoft Corporation of Redmond, Wash.), UNIX (Novell), Solaris (Sun), or Linux (Red Hat). The network 120 may be any one of a number of conventional wired and/or wireless network systems, including a Local Area Network (LAN) or Wide Area Network (WAN), as is known in the art (e.g., using Ethernet, IBM Token Ring, or the like). In an embodiment, the network 120 includes functionality for packaging client calls in the well-known Structured Query Language (SQL) together with any parameter information into a format (of one or more packets) suitable for transmission to the database server system 140. The described computer hardware and software are presented for purposes of illustrating the basic underlying desktop and server computer components that may be employed for implementing embodiments of the present invention. For purposes of discussion, the following description will present examples in which it will be assumed that there exist multiple server instances (e.g., database server nodes) in a cluster that communicate with one or more "clients" (e.g., personal computers or mobile devices). The embodiments of the present disclosure, however, are not limited to any particular environment or device configuration. Instead, embodiments may be implemented in any type of system architecture or processing environment capable of supporting the methodologies presented herein.

In operation, the client computing device(s) 110 store data in, or retrieve data from, one or more source database tables 150, as shown at FIG. 1. Data in a relational database is stored as a series of tables, also called relations. Typically resident on the server 130, each table itself comprises one or more "rows" or "records" (tuples) (e.g., row 155 as shown at FIG. 1). A typical database will include many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Many relational databases implement a variant of the Structured Query Language (SQL), which is a language allowing users and administrators to create, manipulate, and access data stored in the database. SQL statements may be divided into two categories: data manipulation language (DML), used to read and write data; and data definition language (DDL), used to describe data and maintain the database. DML statements are also called queries. In operation, for example, the client computing device(s) 110 issue one or more SQL commands to the server 130. SQL commands may specify, for instance, a query for retrieving particular data (i.e., data records meeting the query condition) from the database table(s) 150. In addition to retrieving the data from database server table(s) 150, the clients 110 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 110 (via network 120) are processed by the source database engine 160 of the DBMS 140. The source database engine 160 itself comprises a parser 161, a normalizer 163, a compiler 165, an execution unit 169, and access method(s) 170. Specifically, the SQL statements are passed to the parser 161 which employs conventional parsing methodology (e.g., recursive descent parsing). The parsed query is then normalized by the normalizer 163. Normalization includes, for example, the elimination of redundant data. Additionally, the normalizer 163 performs error checking, such as confirming that table names and column names which appear in the query are valid (e.g., are available and belong together). Finally, the normalizer 163 can also look-up any referential integrity constraints which exist and add those to the query.

After normalization, the query is passed to the compiler 165, which includes an optimizer 166 and a code generator 167. The optimizer 166 performs a cost-based analysis for formulating a query plan that is reasonably close to an optimal plan. The code generator 167 translates the query plan into executable form for execution. The execution unit 169 executes the query plan using the access methods 170.

In order to increase performance for processing queries or recover from crash of the database server system, a database management system, such as DBMS 140, may perform a multi-pass parallel merge on generated intermediate pages.

Figure 2:
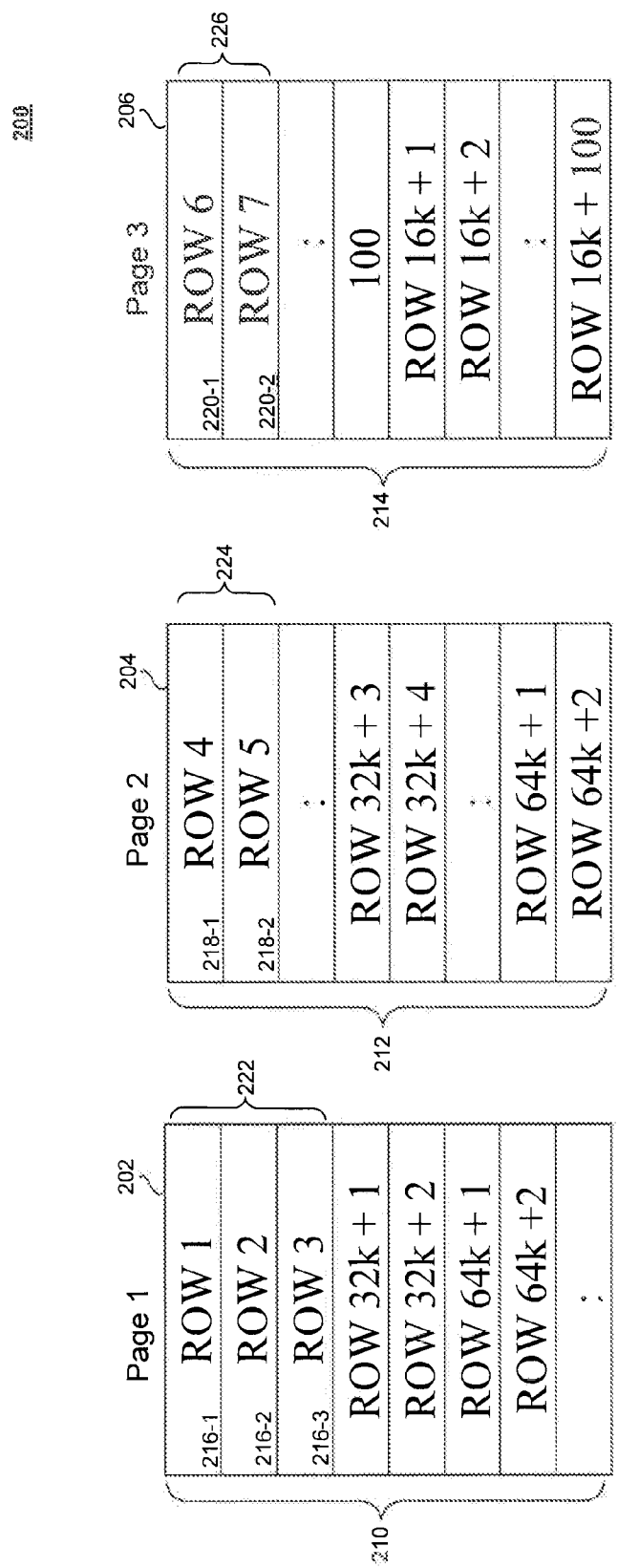
FIG. 2 illustrates a set of intermediate pages, according to embodiments.

FIG. 2 illustrates a database. Database 200 includes intermediate pages 202, 204 and 206. An intermediate page is a "non-final" page which is temporarily generated by a load engine when loading data into a hash-partitioned final page column. Intermediate page 202 includes rows of data 216-1 . . . N, which span across row ID space 210. Intermediate page 204 includes rows of data 218-1 . . . N, which span across row ID space 212 and intermediate page 206 includes rows of data 220-1 . . . N which span across row ID space 214. A row ID space is a set of all possible row identifier values for an intermediate page.

As illustrated in FIG. 2, rows of data 216 of intermediate page 202 include the first three contiguous rows of data which is a first row ID chunk 222. A row ID chunk is a region of consecutive row IDs in the row ID space. A second row ID chunk 224 includes the fourth and fifth consecutive rows of data (i.e. rows 218-1, 218-2) and the third row ID chunk 226 includes the fifth and sixth consecutive rows of data (i.e. rows 220-1, 220-2), which are located on intermediate pages 204 and 206 respectively. Intermediate pages 202, 204 and 206 need to be merged into final pages or "more compact" intermediate pages once the loading of data is complete. A final page is a "normal" data page that includes only one region of contiguous row IDs that either spans the full page or leaves some empty space at the end of the page. It is important to note that after deletion, holes may be generated on a final page, but it is still considered as a final page.

Such a distribution of contiguous rows (i.e. row ID chunks 222, 224 and 226) across different intermediate pages (i.e. 202, 204 and 206), as illustrated by FIG. 2, presents inefficiencies when performing a query operation. Such intermediate pages result in a degraded query performance, because a column data projection algorithm used by a load engine has to constantly jump between different pages in order to load data into contiguous rows.

To improve query performance, embodiments relocate data so that each data page has as few row id gaps between contiguous rows. More specifically, embodiments provide a post-load merge algorithm that merges intermediate pages into final pages or intermediate pages with fewer row ID gaps.

Figure 3:
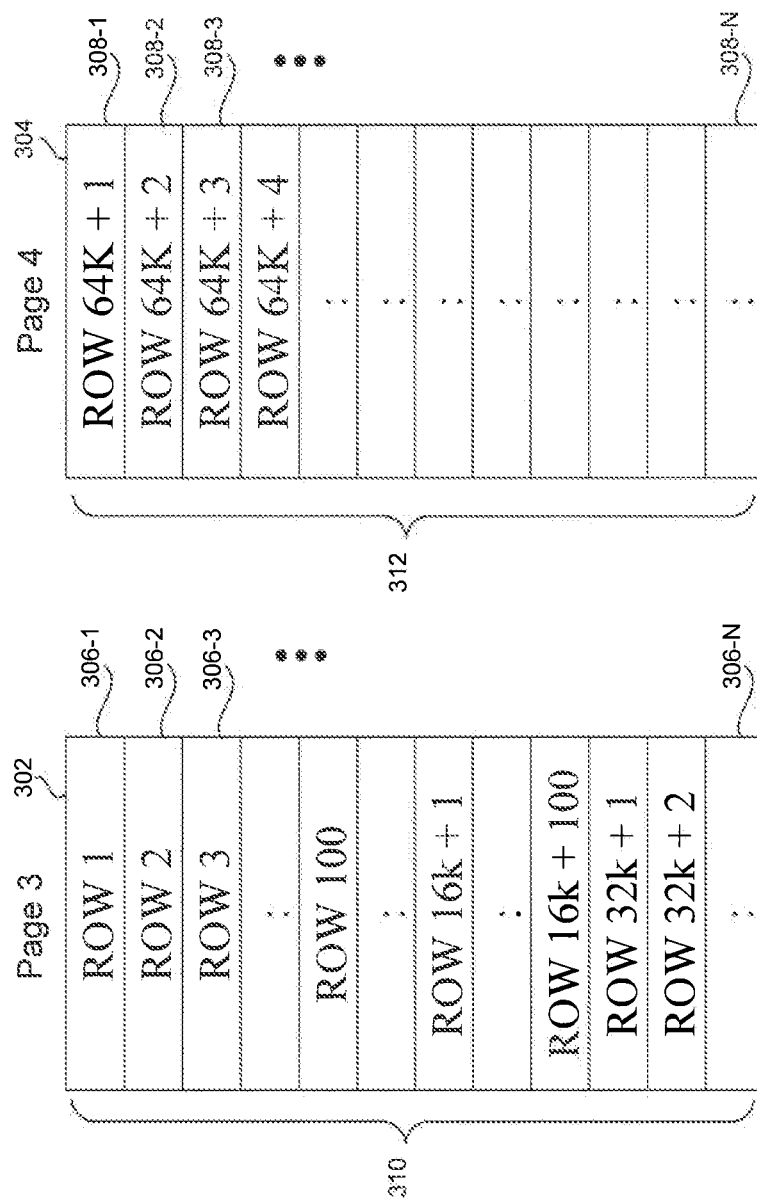
FIG. 3 illustrates a set of final pages, according to an embodiment.

FIG. 3 illustrates the final pages 302 and 304 resulting from the merging of intermediate pages 202, 204 and 206 of FIG. 2, according to embodiments. As illustrated, final page 302 includes a set of contiguous row IDs 306-1 . . . N, which span the entire row ID space 310. Final page 304 includes a set of contiguous row IDs 308-1 . . . N, which span the entire row ID space 312. Techniques of merging the intermediate pages 202, 204 and 206 of FIG. 2 into the final pages 302 and 304 of FIG. 3 will be discussed in more detail below.

Figure 4:
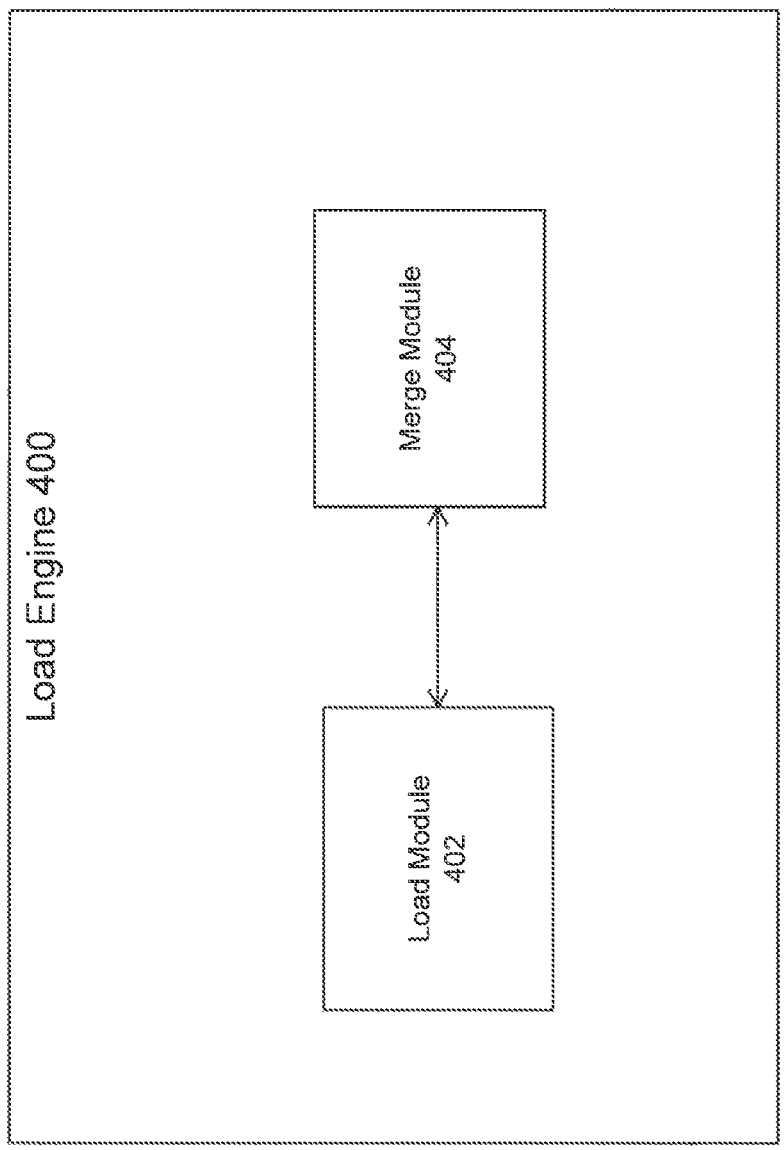
FIG. 4 illustrates a load engine system, according to embodiments.

FIG. 4 illustrates a load engine 400, according to embodiments. Load engine 400 includes a load module 402 and a merge module 402. According to embodiments, load engine 400 is configured to operate on hash and hash-range partitioned tables and is also configured to execute in two phases: (i) a load phase; and (ii) a merge phase. During the load phase, incoming data is written into intermediate pages. During the merge phase, intermediate pages are merged.

In operation, load engine 400 is configured to produce final pages with one contiguous row id range that spans a fall row id range of a page or with some empty space at the end of the page. Additionally, load engine 400 is also configured to produce intermediate pages with larger regions of rows packed into a contiguous row id range, according to embodiments. In this way, a query engine can project rows efficiently with more rows in a contiguous row id range.

In another embodiment, the load engine 400 ensures that the number of intermediate pages which are merged is proportional to the size of the data loaded to achieve a steady state of the load. As the intermediate page merging may be a multi-pass process before final pages can be produced, the load engine 400 also ensures that a minimum number of passes over data is done in order to produce final pages. In this way, embodiments do not suffer from any latency or inefficiencies.

According to an embodiment, during a first pass of a load, load module 402 is configured to perform parallel load. Each load thread writes incoming rows into an intermediate page until it is full. In the meantime, it allocates a temporary region buffer to store metadata of row identifier to region mappings, and a temporary MergeGroup buffer to store metadata of produced intermediate pages, and executes steps to fill the buffers. In an embodiment, when an intermediate page is filled, load module 402 determines a merge level for the intermediate page P based on a calculated fill factor 'F'. Load module 402 then updates each region in the temporary region list with page level information/metadata, including the starting and ending region bit for the first and last regions of the intermediate page.

According to an embodiment, load module 402 computes a fill factor for each generated intermediate page. The fill factor 'F' measures the "compactness" of the generated intermediate page. According to an embodiment, a fill factor 'F' can be used to divide a set of intermediate pages into groups of pages for merging in successive passes, where $$F = (\text{ending row id on page} - \text{starting row id on the page})/(\text{\# rows on the page}) \quad (1)$$

In an embodiment, the fill factor 'F' computes a fill ratio of rows in a row id (RID) range of a data page. In another embodiment, a small fill factor 'F' value is an indication that there are more rows that are filled in the RID range of an intermediate page versus gaps. Conversely, a higher fill factor 'F' value indicates that there are more RID gaps in the intermediate page. In an example embodiment, if the page is a final page, the fill factor 'F' would be 1, because a final page includes only one region of contiguous row IDs that either spans the full page or leaves some empty space at the end of the page, as discussed previously. Afterwards, intermediate pages with higher 'F' are merged into final pages (with 'F' equal to 1) and intermediate pages with lower 'F', the query engine will be able to project rows more efficiently.

According to an embodiment, load module 402 is configured to utilize the fill factor 'F' to group intermediate pages. An intermediate page may be grouped into or labeled as one of three merge levels, M1, M2 and M3 based on the fill factor 'F', according to an embodiment. While embodiments and examples will be discussed using three merge levels, one of ordinary skill in the art will appreciate that embodiments are not limited to three merge levels and any number of merge levels may be utilized. A plurality of fill factor ranges or thresholds may be used to determine which merge level an intermediate page will be placed. For example the following fill factor ranges/thresholds may be utilized: (1) $F \leq 16$; (2) $256 \geq F > 16$; and (3) $F > 256$. Accordingly, if an intermediate page has a fill factor value that falls within fill factor range/threshold (1) $F \leq 16$, load module 402 is configured to place the intermediate page into a first merge level M1. If an intermediate page has a fill factor value that falls within fill factor range/threshold (2) $256 \geq F > 16$, load module 402 is configured to place the intermediate page into a second merge level M2. Finally, if an intermediate page has a fill factor value that falls within fill factor range/threshold (3) $F > 256$, load module 402 is configured to place the intermediate page into a third merge level M3. As a result of these groupings of intermediate pages into merge levels based on its respective fill factors by load module 402, M1 is at the lowest level, indicating that the intermediate pages included in merge level M1 have the most rows that are filled in the RID ranges of the intermediate pages, while M3 is at the highest level, indicating that the intermediate pages included in merge level M3 have the least rows that are filled in the RID ranges of the intermediate pages.

In embodiments, to facilitate intermediate page merging, each final page will maintain additional bookkeeping information during the load phase which will be used to determine what to merge and how much to merge. According to an embodiment, during the load phase, load module 402 collects a set of relevant metadata associated with the intermediate pages and stores the collected metadata in persistent data structures. In an embodiment, load module 402 is configured to utilize a MergeMap to store a first set of metadata and statistics associated with an intermediate page. A MergeMap is a persistent b-tree data structure which is used to store row ID-to-region mappings for intermediate page regions. A B-tree is defined as a tree data structure that keeps data sorted and allows searches, sequential access, insertions, and deletions in logarithmic time. As discussed previously, a region is defined as a set of contiguous row IDs. According to an embodiment, each intermediate page region has a single entry in the MergeMap and is keyed by a start RID of the intermediate page region. The single entry of the intermediate page can be stored by load module 402 as a plurality of bits and can include the following metadata and statistics associated with the intermediate page:

i. Region offset: Offset of the $1^{st}$ row of the region (1-based). It is also called relative RID of the $1^{st}$ row of the region.

ii. Region row count: Number of rows in the region.

iii. "2 bits for merge level": Two bits are used to record merge level of a region. 01—level 1, 10—level 2, 11—level 3.

iv. "IP bit": A bit to indicate it's a region of an intermediate page.

v. "First region bit": A bit to indicate if the intermediate page region is the 1st region on page.

vi. "Last region bit": A bit to indicate if the intermediate page region is the last region on page.

vii. Blocknumber: Block number of the intermediate page.

According to another embodiment, load module 402 is configured to utilize a MergeGroups data structure to store a second set of metadata and statistics associated with an intermediate page. A MergeGroups data structure is also a persistent b-tree data structure which is utilized to perform bookkeeping for groups of intermediate pages with overlapping RID ranges, according to an embodiment. Based on the partition type, the MergeGroups b-tree has different kind of keys, according to an embodiment. For example, a hash-partitioned type will have a key that is based on the merge level (1, 2 or 3). Thus, in this example the MergeGroups b-tree can only have up to 3 entries. Alternatively, a hash-range partitioned type utilizes a compound key comprised of the merge level and a partition ID (PID) range. Thus, in this example, the MergeGroups b-tree can only have up to 3*1024 entries (if there are 1024 range partitions). According to an embodiment, an entry of the MergeGroups b-tree can be stored by load module 402 as a plurality of bits and can include the following metadata and statistics associated with the intermediate page:

i. Minimum RID in the group (i.e. starting row id)
ii. Maximum RID in the group (i.e. ending row id)
iii. Range PID (meaningful only for hash-range partitioned table): 0-1023.
iv. Number of pages in the group
v. Number of batches. (A batch is a set of rows sorted in-memory before being inserted into a hash, range, or hash-range partitioned table.)
vi. Merge level: 1, 2 or 3.

In this way, load module 402 is configured to utilize MergeGroups to provide information for determining when to merge and what data to merge for a group of intermediate pages at different merge levels.

According to an embodiment, when either the temporary region buffer or temporary MergeGroup buffer is full, the load thread acquires the lock to the shared MergeMap (i.e. prevent any further entries) and flushes the temporary regions, whose pages have been completed, to the shared MergeMap data structure. Similarly, it also flushes the temporary MergeGroup list to the shared MergeGroups data structure.

Figure 5:
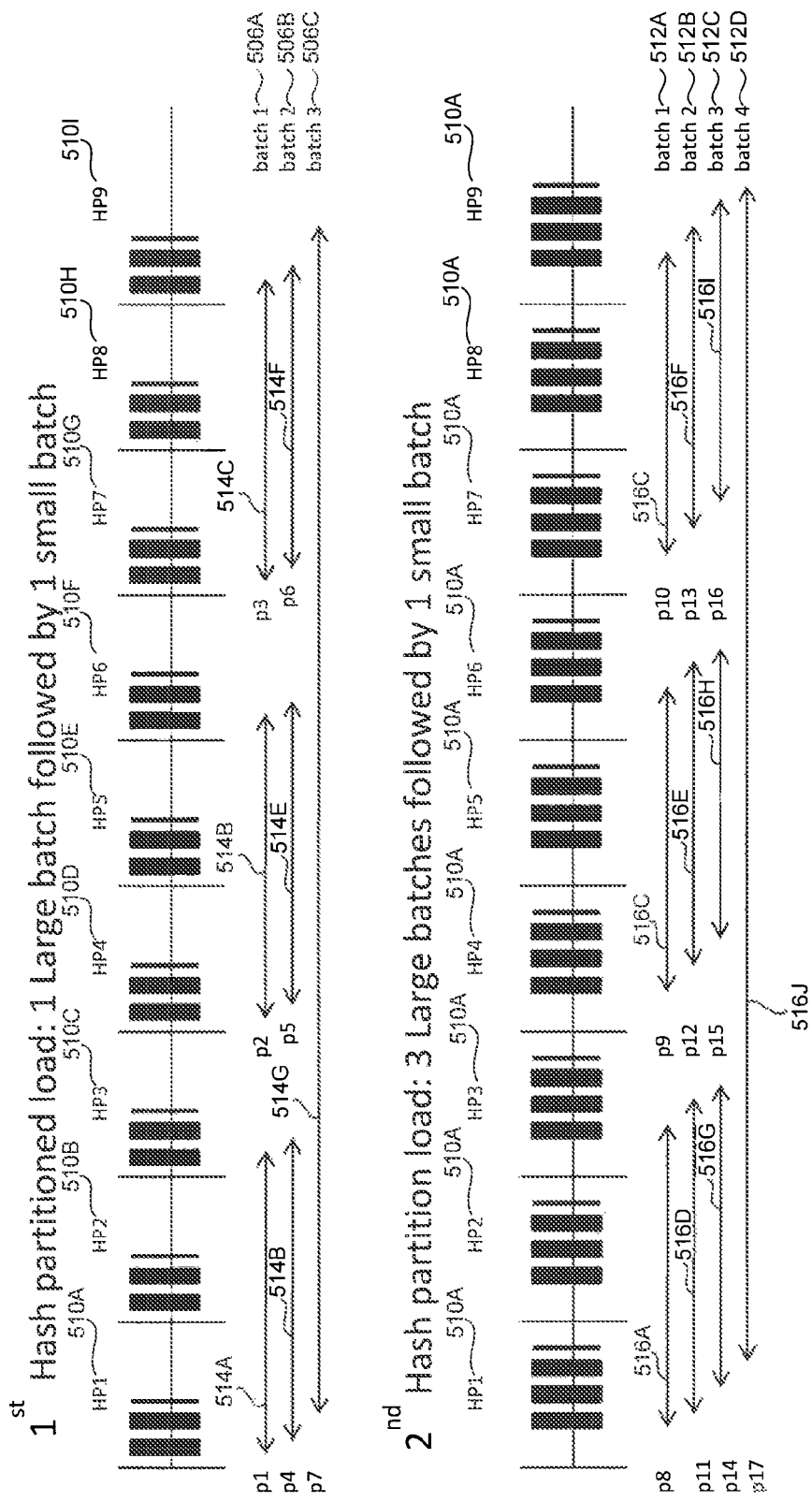
FIG. 5 illustrates a hash-partitioned load, according to embodiments.
Figure 6:
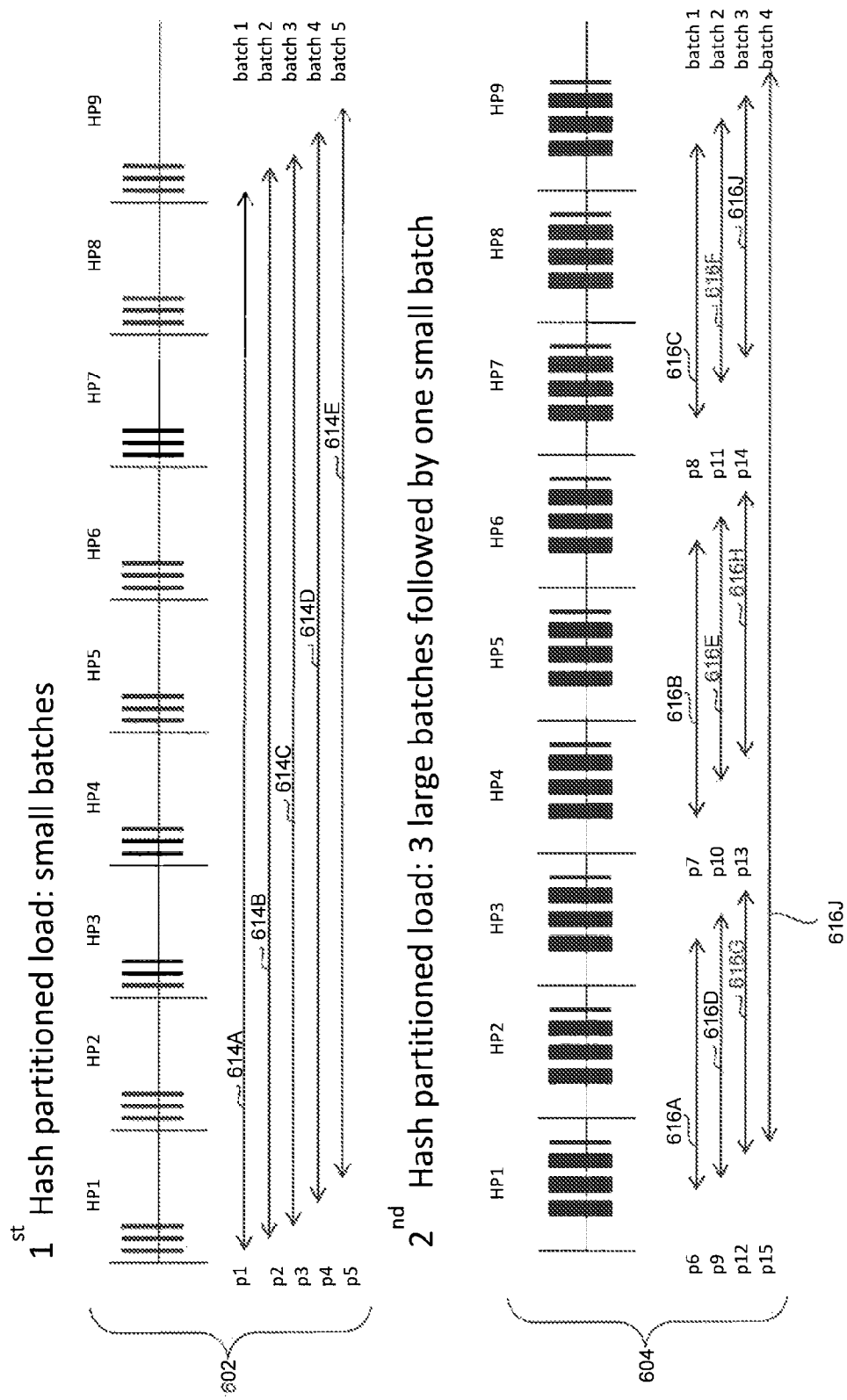
FIG. 6 illustrates a hash-partitioned load, according to embodiments.

According to an embodiment, at the end of first pass, merge module 404 commences a merge phase. FIG. 5 and FIG. 6 are examples of hash partitioned loads that form groups of intermediate pages which may be merged. The intermediate pages have overlapping ranges at different merge levels. In these examples, there are 9 hash partitions HP1 to HP9 and 17 intermediate pages P1 to P17. Each intermediate page includes a number of rows from more than one hash partition.

FIG. 5 illustrates two hash partitioned loads 502 and 504 with the same memory size and different data sizes. Hash partitioned load 502 includes three batches of intermediate pages 506-A, 506-B, 506-C. Each batch 506 includes respective intermediate pages 508. A batch is a set of rows sorted in-memory before being inserted into a hash, range, or hash-range partitioned table.

As illustrated, the batch of intermediate pages 506 span across the hash partitions 510-A through 510-I. As illustrated, the batches of intermediate pages 506 include intermediate pages which overlap common hash partitions 510. For example, intermediate page 514-A of batch 506-A and intermediate page 514-D of batch 506-2 have overlapping row id ranges because each intermediate page spans across a common and contiguous set of hash partitions 510-A, 510-B and 510-C.

Hash partitioned load 504 includes four batches of intermediate pages 512-A, 512-B, 512-C, 512-D. Each batch 512 includes respective intermediate pages 516. As illustrated, the batches of intermediate pages 512 span across the hash partitions 510-A through 510-1. As illustrated, the batches of intermediate pages 512 include intermediate pages which overlap common hash partitions 510. For example, intermediate page 516-A of batch 512-A, intermediate page 516-D of batch 512-B and intermediate page 514-G of batch 512-C all have overlapping row id ranges because each intermediate page spans across hash partitions 510-A, 510-B and 510-C. Additionally, intermediate pages 514-A, 514-D and 514-G of load 504 also overlap with intermediate pages 514-A and 514-B of load 502, discussed above.

According to an embodiment, at the end of the second load 504, groups of overlapping intermediate pages at a level Mx can be generated, where Mx is the determined merge level of the intermediate pages based on their respective fill factors satisfying the fill factor range/threshold discussed previously. Thus, in FIG. 5, three groups of overlapping intermediate pages at level Mx (514-A, 514-D, 516-A, 516-D, 516-G), (514-B, 514-E, 516-B, 516-E, 516-H), (514-C, 514-F, 516-C, 516-F, 516-I) and one group of intermediate pages at level Mx+1 (514-G, 516-J) are generated.

FIG. 6 illustrates two hash partitioned loads 602 and 604 with different memory sizes and different data sizes. As with loads 502 and 504 of FIG. 5, at the end of the second load 604, groups of overlapping intermediate pages at a level Mx can be generated. Thus, in FIG. 6, three groups of overlapping intermediate pages at level Mx (616-A, 616-D, 616-G), (616-B, 616-E, 616-H), (616-C, 616-F, 616-I) and one group of intermediate pages at level Mx+1 (614-A, 614-B, 614-C, 614-D, 614-E, 616-J) are generated.

Returning to FIG. 4, according to an embodiment, by maintaining groups of intermediate pages in overlapping ranges at each merge level, merge module 404 can trigger intermediate page merging for a merge level when there are enough overlapping pages to be merged for a merge level. In an embodiment, merge module 404 is configured to trigger intermediate page merging for a merge level when the average number of pages per group at a particular merge level satisfies a threshold of N pages, according to an embodiment. For example, N can be determined to be 16 to reduce the fill factor of pages in each group by a magnitude smaller than that which will most likely fit into a next lower merge level.

According to an embodiment, when intermediate page merging is triggered by merge module 404 for a merge level Mx, all intermediate pages at the same or higher merge levels will be merged. Additionally, all pages in lower merge levels will be skipped. This is because intermediate pages at higher merge levels than merge level Mx should fill gaps in the RID space assigned to each partition at merge level Mx. Therefore, the result of the merge produces intermediate or final pages with better fill factors. However, intermediate pages at a lower merge level than merge level Mx should not be merged to avoid putting the resulting pages back into the same lower merge level and thus repeating merging in another pass. This is to avoid merging data at the lower levels more than once during subsequent passes.

According to an embodiment, during a LOAD or INSERT, a total count of the intermediate pages that are merged needs to be proportional to the number of new intermediate pages created during the load phase. In an embodiment, the total count of pages to merge for a table is calculated utilizing the number of newly created intermediate pages at all levels:

$$\text{total count of intermediate pages to merge for the table}=\text{sum(count of newly create intermediate pages at merge level } x^*x, \text{ for } x=1,2,3 \text{ in all FP's.)} \quad (2)$$

This calculation is based on the fact that for each new intermediate page created at a merge level Mx, the number of intermediate pages to merge would be x, since it takes roughly x passes to merge intermediate pages into final pages.

According to an embodiment, the calculated total count of intermediate pages to merge for the table will be used by merge module 404 to merge as many columns of data in full until the number of pages merged exceeds the total count. According to another embodiment, if the number of intermediate pages to merge at a particular merge level and at higher merger levels is less than a maximum count of pages requested to be merged, a full merge of all pages at the merge level and higher will be performed by merge module 404.

In another embodiment, merge module 404 is configured to perform a partial merge when the maximum count of intermediate pages requested to be merged is less than the total number of pages to be merged at a particular merge level and at a higher merge level.

Examples of Merging

As discussed previously, at the end of the load phase, it is determined whether or not to trigger the merge and a merge mode is set by merge module 404. Due to the columnar architecture of the system, such a determination is made on a per column basis. According to embodiments, if the load is an initial load then merge module 404 is configured to always trigger a merge (i.e. merge mode is set to "merge everything"). If the load is determined to be an incremental load (i.e. not the first load), the following merge determinations can be made by merge module 404: (i) if no merge level has a batch count equal to or greater than, but not limited to, 16, do not trigger the merge (i.e. the merge mode is set as "merge nothing"); (ii) if merge level k (k>1) has a batch count equal to or greater than 16, and the ratio of outstanding intermediate pages is less than 10%, the merge operation is triggered. The merge mode is set as "full merge by level" k, which means, all pages in level k and higher are merged; and (iii) if merge level M1 has a batch count equal to or greater than 16, the merge is triggered and the merge mode is set to "merge everything".

In an embodiment, a thread team can be spawned by merge module 404 to handle parallel merging. In embodiments, when a merge operation is triggered, the merge is performed fully in parallel by merge module 404. For example, each thread is assigned with a column to merge. If there is no column left to merge, more than one thread can merge one column in parallel. Parallel merging of one column is made possible through RID range carving. RID range carving takes places as follows: A merge thread t1 is initially assigned with a RID range for the column to merge. For the assigned RID range, the merge thread t1 can merge one work unit of N rows at a time. The work unit size 'N' can be in multiples of 64M, calculated from (RID range/number of threads), to allow for maximum parallelism of one thread per work unit. When a thread t2 joins a thread t1 to merge the same column, thread t2 will carve out the second half of the remaining RID range originally assigned to thread t1 and start the merge of one work unit at a time in parallel. This process repeats which allows more threads to join the parallel merge of the same column, until the remaining RID range is less than one work unit size.

Overall, merging is performed in multiple passes of a load by merge module 404. If a merge is triggered by a load, it generates either final or intermediate pages. Intermediate pages will become candidates for subsequent loads. The process repeats until a maximum amount of final pages are generated. Additionally, according to an embodiment, an intermediate page is marked as final page if the following conditions are satisfied: (i) the page only has 1 region of consecutive RIDs; or (ii) the region is from a fully assigned RID space chunk. A final page will no longer become a merge candidate for subsequent incremental loads.

As discussed previously, merge module 404 is configured to calculate the average number of pages per group for each merge level and determine which merge level of intermediate pages to merge and the RID range to merge. For example, merge module 404 can determine if the average number of pages per group at a level x, for x=3, 2, 1, is greater than or equal to 16. If no merge levels return an average greater than 16, then this is an indication that no merging of intermediate pages is needed.

Alternatively, if a single merge level is identified as having enough pages to merge, the identified merge level will be merged, according to an embodiment. If the merge level is not M1, an estimate will be made to determine if merging the identified merge level and the higher merge levels will create enough pages in the lower merge level, such that pits average pages per group will be greater than or equal to 16, for example.

According to an embodiment, if two adjacent merge levels have enough pages to merge, the lower merge level will be set to the level to merge and all pages in that level and higher levels will be merged. If the level to merge is not M1, the same estimate as discussed above will be checked to determine if M1 should be returned instead.

in another embodiment, if all three levels satisfy the merge threshold, merge level M1 will be returned and all pages in all three levels will be merged.

In this way embodiments have the following advantages over previous systems: (i) definition of fill factor to measure "compactness" of a page; (ii) using fill factor to partition data pages into multiple merge levels; (iii) a persistent b-tree data structure to bookkeep groups of overlapping intermediate pages and provide information for determining when to merge and what to merge; (iv) a mechanism that determines when to trigger the merge based on collected statistics in the MergeGroups b-tree; (v) a mechanism that determines whether to perform a complete merge or partial merge. If it is partial merge, the system further determines what portion of data needs to merge, based on distribution of pages across merge levels, and collected statistics in the MergeGroups b-tree; (vi) merge is done in multiple passes of load. In other words, merge continues in future incremental loads; and (vii) after a merge, data cells of hash or hash-range partitioned columns are co-located to enable faster data retrieval.

Figure 7:
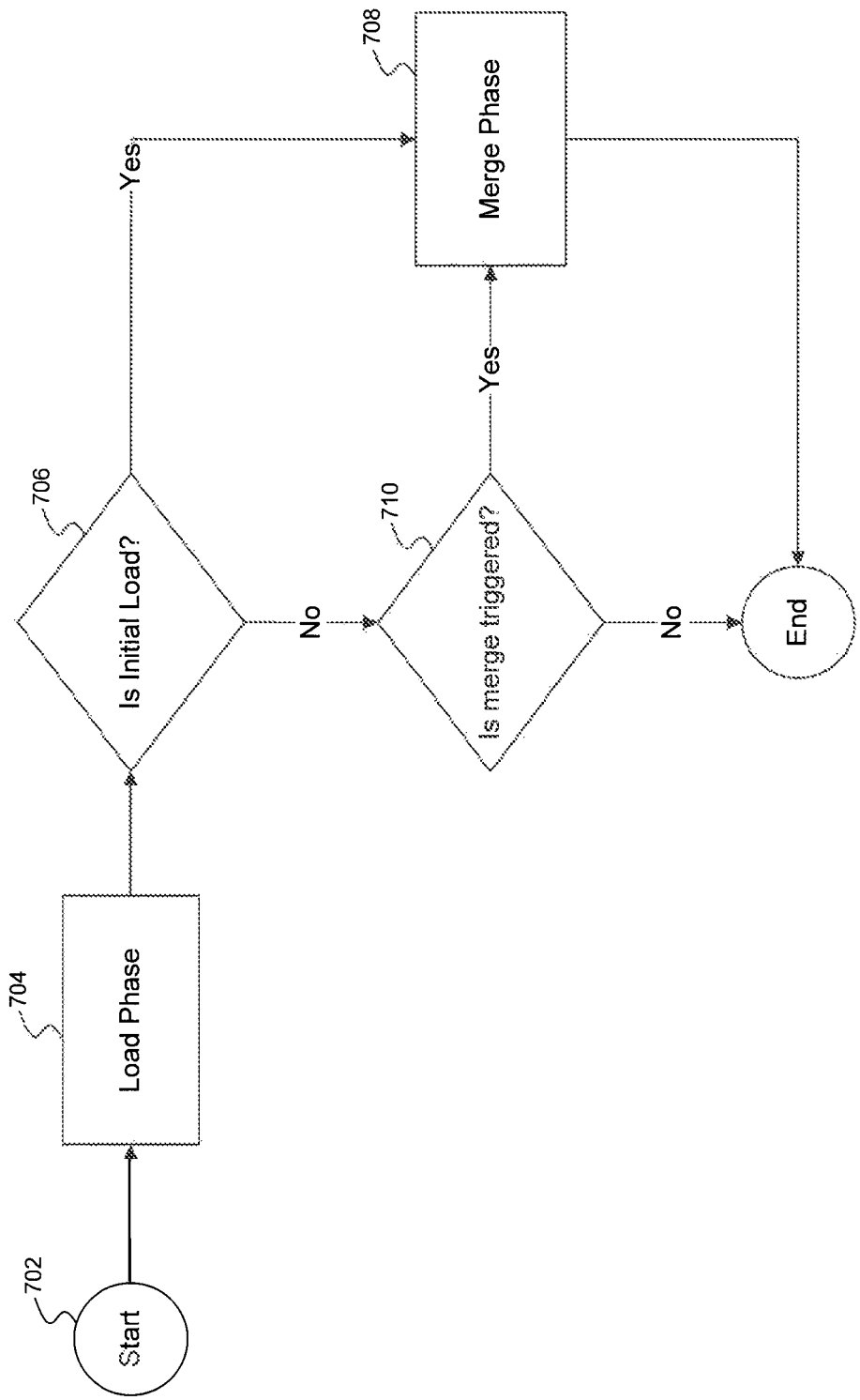
FIG. 7 is a flowchart illustrating a process by which a load engine facilitates a multi-pass, parallel merging scheme, according to an embodiment.

FIG. 7 is a flowchart illustrating an exemplary method 700, according to an embodiment.

In one example, method 700 can be used to improve query performance of hash or hash-range partitioned intermediate pages via multi-pass, parallel merging. The method 700 may not occur in the order shown, or require all of the steps shown in FIG. 7.

Method 700 starts at step 702. At step 704, a load phase is initiated. During a load phase, data is loaded into an end target of the database. For example, the end target can be a data warehouse. During the load phase, data is written into rows of the intermediate pages. As the load phase interacts with a database, the constraints defined by the database schema, as well as triggers activated upon loading of the data may apply, which contribute to the overall quality of the data.

At step 706, it is determined whether the load phase is an initial load. If the load is an initial load, method 700 proceeds to step 708. If the load is not an initial load, then it is determined to be an incremental load and method 700 proceeds to step 710.

At step 708, a merge phase is triggered. As discussed previously, a merge phase is always triggered when the load is an initial load.

At step 710, a load is determined to be an incremental load and it is determined whether to trigger a merge. As discussed previously, if the load is determined to be an incremental load a merge can be triggered based on the batch count meeting or exceeding a predetermined batch threshold. Based on the batch value, a partial or complete merge of intermediate pages at different merge levels can be performed. Method 700 ends at step 712.

Figure 8:
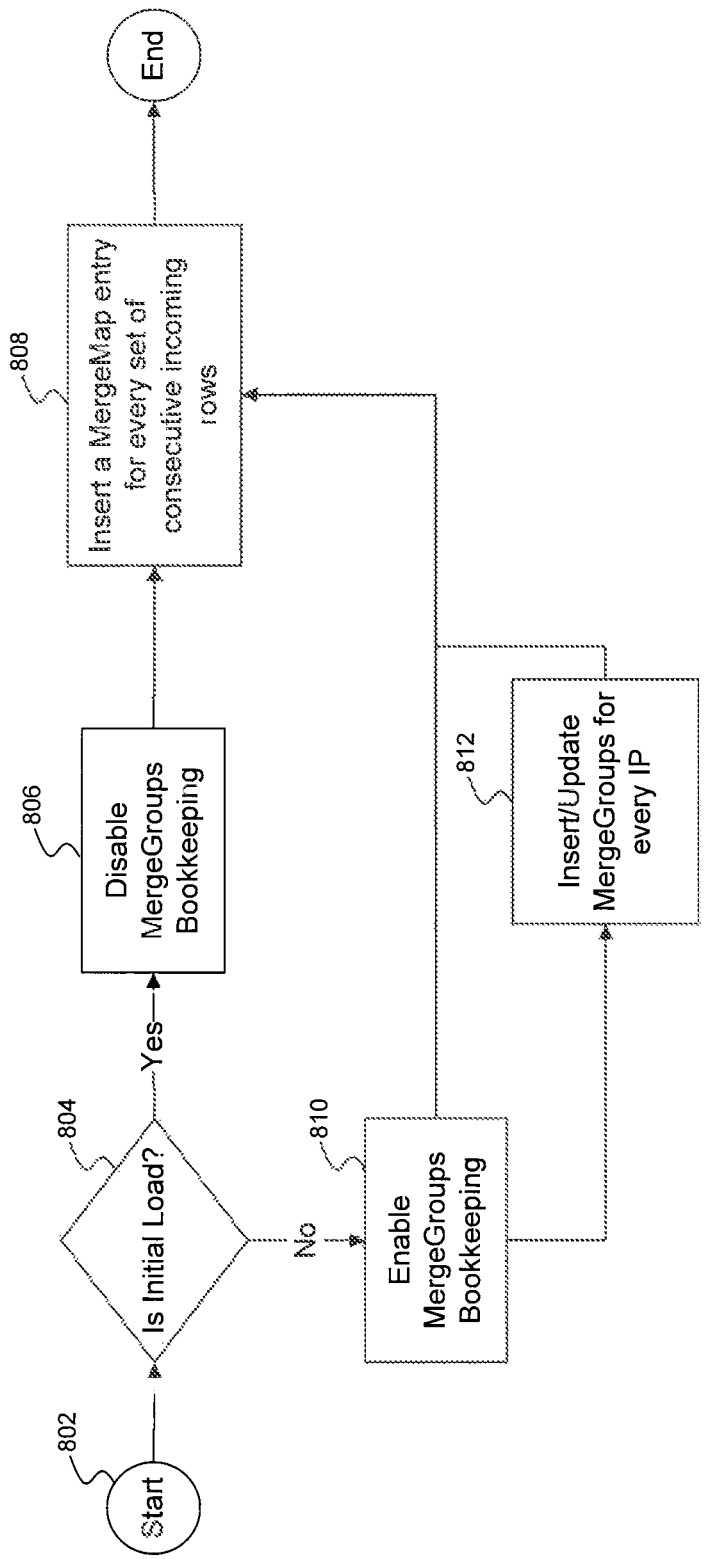
FIG. 8 is a flowchart illustrating another process by which a load engine facilitates a multi-pass, parallel merging scheme, according to an embodiment.

FIG. 8 is a flowchart illustrating an exemplary method 800, according to an embodiment.

Method 800 illustrates the load phase process, according to embodiment. Method 800 starts step 802. At step 804, it is determined whether a load is an initial load. Step 804 is similar to step 706 of FIG. 7 discussed above. If the load is determined to be an initial load, method 800 proceeds to step 806, If the load is determined to be an incremental load, method 800 proceeds to step 810.

At step 806, MergeGroups bookkeeping is disabled. As discussed previously, MergeGroups bookkeeping is utilized in order to store metadata and statistics associated with an intermediate page. More specifically, MergeGroups is used to perform bookkeeping for groups of intermediate pages with overlapping RID ranges and enables the system to intelligently determine when and how to merge intermediate pages. Since an initial load is configured to always be merged, there is not a need to collect MergeGroups statistics during the load phase. As a result, the processing of an initial load is optimized.

At step 808, a MergeMap entry is inserted for every set of consecutive incoming rows. As discussed previously, a MergeMap is a persistent b-tree data structure which is used to store row ID-to-region mappings for intermediate page regions and a region is defined as a set of contiguous row IDs. According to an embodiment, each intermediate page region has a single entry in the MergeMap and is keyed by a start RID of the intermediate page region.

At step 810, if a load is determined to be an incremental load, MergeGroups bookkeeping is enabled. If MergeGroups bookkeeping is enabled, method 800 proceeds to step 812 where an insert or update operation is performed for every intermediate page. According to an embodiment, an entry of the MergeGroups can be stored as a plurality of bits and can include, but is not limited to the following metadata and statistics associated with the intermediate page:
  i. Minimum RID in the group (i.e. starting row id)
  ii. Maximum RID in the group (i.e. ending row id)
  iii. Range PID (meaningful only for hash-range partitioned table): 0-1023.
  iv. Number of pages in the group
  v. Number of batches. (A batch is a set of rows sorted in-memory before being inserted into a hash, range, or hash-range partitioned table.)
  vi. Merge level: 1, 2 or 3.

As a result, MergeGroups is utilized to provide information for determining when to merge and what data to merge for a group of intermediate pages at different merge levels. Following step 812, method 800 then proceeds to step 808, as discussed before, where a MergeMap entry is also inserted for every set of consecutive incoming rows for the incremental load.

Figure 9:
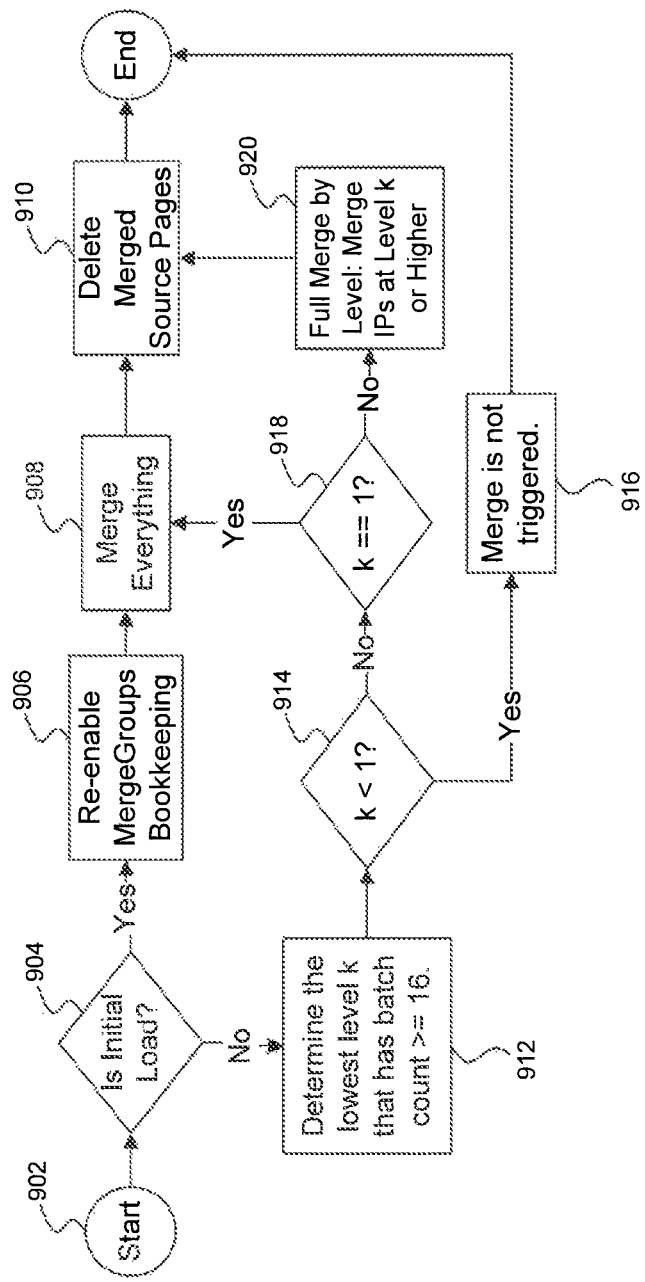
FIG. 9 is a flowchart illustrating another process by which a load engine facilitates a multi-pass, parallel merging scheme, according to an embodiment.

FIG. 9 is a flowchart illustrating an exemplary method 900, according to an embodiment. Method 900 illustrates the merge phase processing which may be performed by merge module 404 of FIG. 4, for example.

Method 900 starts at step 902. At step 904, it is determined whether the load is an initial load. Step 904 is similar to step 804 of FIG. 8 and step 706 of FIG. 7. If a load is an initial load, method 900 proceeds to step 906. At step 906, MergeGroups bookkeeping is re-enabled. MergeGroups bookkeeping is re-enabled since an initial load always triggers a merge and the information included in the MergeGroups can be used to merge intermediate pages into final pages. At step 908, a merge mode is set to "Merge Everything" and intermediate pages at all merge levels are merged. At step 910, data cleanup is performed by deleting merged source pages.

If a load is determined to be an incremental load, method 900 proceeds to step 912. At step 912, the lowest merge level k which has a batch count that satisfies a batch count threshold is determined. For example, as discussed previously, a batch count threshold of 16 can be used and merge processing will only be triggered if the batch count threshold is net or exceeded.

At step 914, it is determined if the lowest merge level k is less than 1. If the merge level k is less than 1, then method 900 proceeds to step 916 where a merge is not triggered (i.e. merge operations only performed on merge levels 1, 2, 3). If the merge level is not less than 1, the merge level k is then examined to determine if it is equal to 1 at step 918. If the merge level k is equal to 1, then method 900 proceeds to step 908, where intermediate pages of all merge levels are merged. If the merge level k is greater than but not equal to 1, method 900 proceeds to step 920, where the merge mode is set to "Full Merge By Level." The merge mode of step 920 is a partial merge since only intermediate pages at level k and higher are merged, instead of merging all levels.

In this way, the merge phase determines whether or not to trigger a merge operation. Additionally, if a merge operation is triggered, the merge phase determines whether to merge everything or perform a partial merge.

Figure 10:
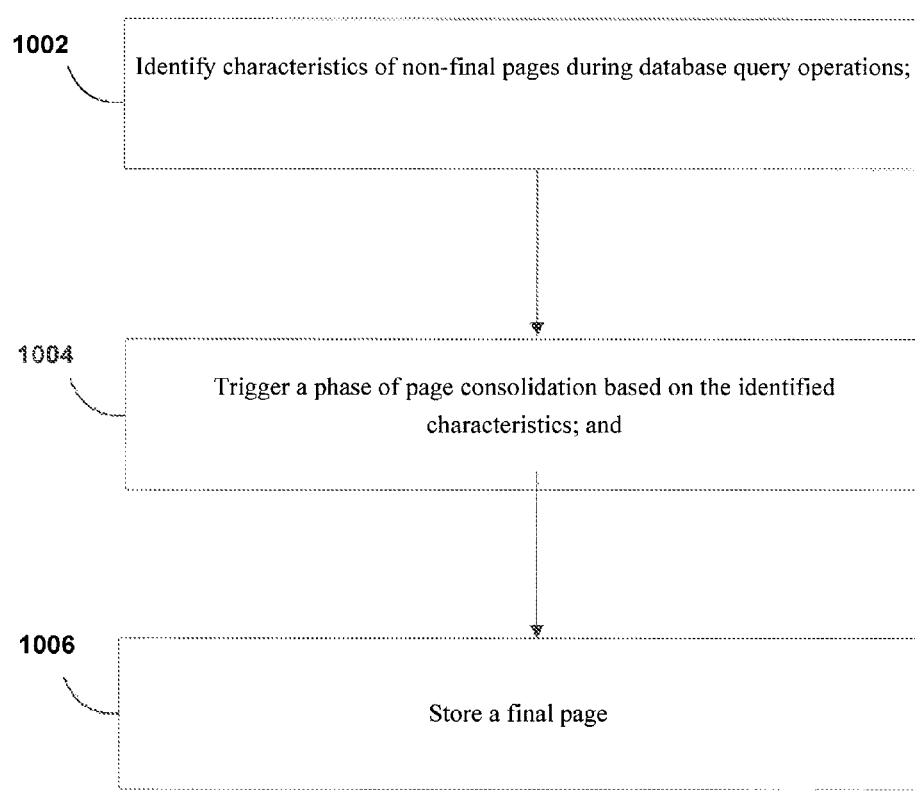
FIG. 10 is a flowchart illustrating another process by which a load engine facilitates a multi-pass, parallel merging scheme, according to an embodiment.

FIG. 10 is a flowchart illustrating an exemplary method 1000, according to an embodiment. At step 1002 characteristics of non-final pages are identified during database query operations. For example, identifying characteristics of non-final pages can include determining a fill factor for the non-final pages and determining a merge level for the non-final pages based on the determined fill factor, as discussed previously.

At step 1004, a phase of page consolidation is triggered based on the identified characteristics. For example step 1004 is similar to method 900 of FIG. 9, which illustrates merge phase processing.

At step 1006, a final page is stored. Once non-final pages are consolidated and row gaps are removed or reduced, a final page is stored.

Example Computer System

Figure 11:
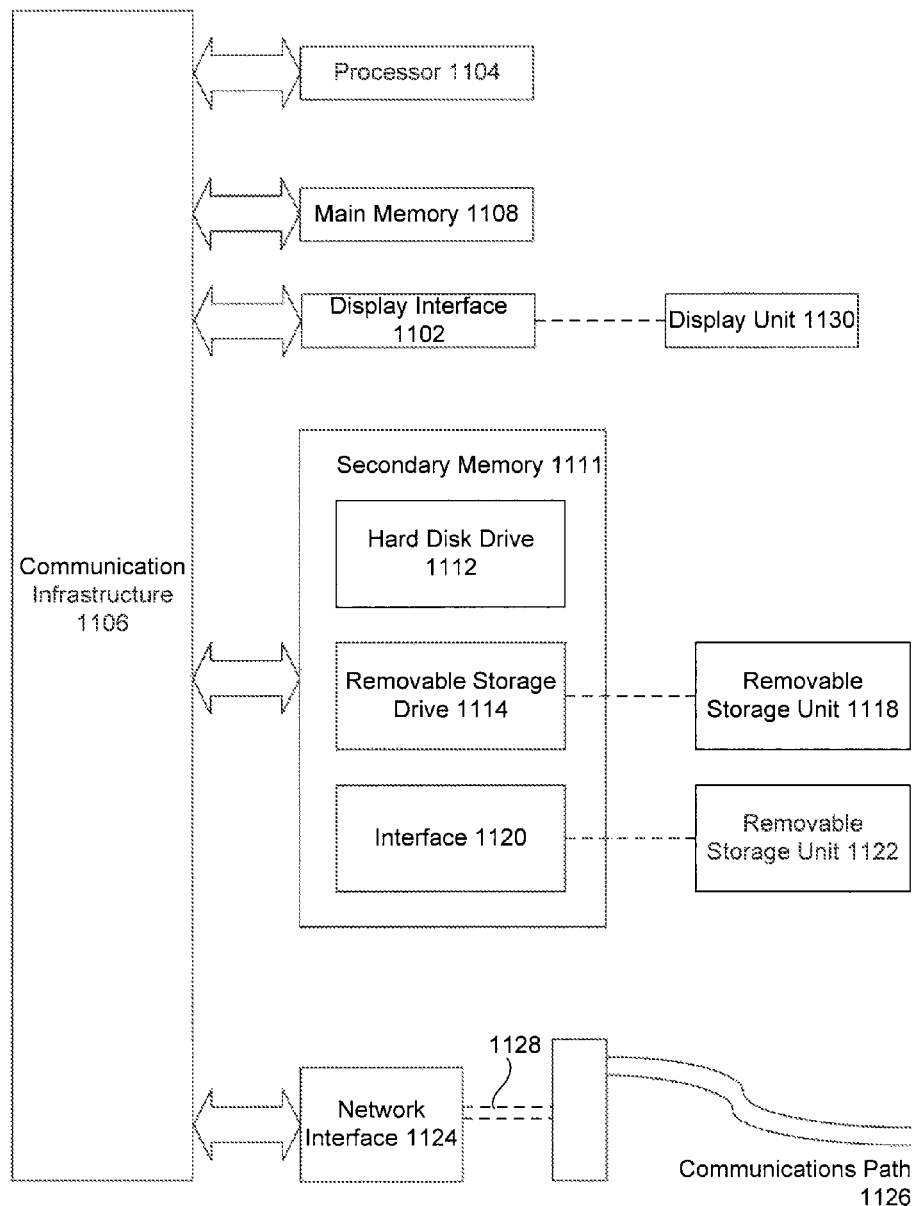
FIG. 11 illustrates an example computer useful for implementing components of various embodiments.

Various embodiments can be implemented, for example, using one or more well-known computer systems, such as computer system 1100 shown in FIG. 11. Computer system 1100 can be any well-known computer capable of performing the functions described herein, such as computers available from International Business Machines, Apple, Sun, HP, Dell, Sony, Toshiba, etc.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1100 also includes user input/output device(s) 1103, such as monitors, keyboards, pointing devices, etc., which communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 11. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof . . . The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for consolidating a database, comprising:
identifying, at a server device, characteristics of non-final pages in the database in response to a database query;
triggering, at the server device, a phase of page consolidation based on the identified characteristics, wherein said triggering comprises:
initiating a load phase for the non-final pages based on the identified characteristics, while allocating memory in the database for a plurality of persistent data structures used to store metadata associated with the non-final pages in the database, wherein initiating the load phase comprises:
determining row-identifier to region mappings for non-final page regions of the non-final pages,
determining overlapping row-identifier ranges between the non-final pages and additional non-final pages, and
storing the metadata in the plurality of persistent data structures, wherein a first data structure is utilized to store information related to overlapping non-final pages and a second data structure is utilized to store the row-identifier to the region mappings for the non-final page regions of the non-final pages; and
generating, at the server device, a final page in the database in response to the phase of page consolidation.

2. The method of claim 1, wherein identifying characteristics of the non-final pages comprises:
determining a fill factor for the non-final pages; and
determining a merge level for the non-final pages based on the determined fill factor.

3. The method of claim 2, wherein triggering a phase of page consolidation comprises:
determining when to trigger a merge phase based at least in part on the initiated load phase and the characteristics of the merge level.

4. The method of claim 2, wherein determining a fill factor comprises:
determining a last row identifier for the non-final pages;
determining a first row identifier for the non-final pages; and
determining a level of compactness of the non-final pages based on a comparison of the last row identifier, the first row identifier and a total number of rows of the non-final pages.

5. The method of claim 2, wherein determining a merge level comprises:
labeling the non-final pages as a first merge level when the fill factor meets a first threshold;
labeling the non-final pages as a second merge level when the fill factor meets a second threshold; and
labeling the non-final pages as a third merge level when the fill factor meets a third threshold.

6. The method of claim 3, wherein determining when to trigger a merge phase comprises:
when the load phase is an initial load:
performing a merge operation with the non-final pages; and
when the load phase is an incremental load:
determining a batch count for each merge level;
determining a ratio of outstanding non-final pages;
determining a merge mode based on the batch count; and
performing a merge operation with the non-final pages based on the determined merge mode, wherein the merge mode determines a level of merging.

7. The method of claim 6, wherein performing a merge operation comprises:
performing one of a partial merge and a complete merge with the non-final pages to generate final pages and intermediate pages.

8. The method of claim 1, wherein initiating a load phase further comprises:
determining a load state of a load including the non-final pages;
collecting the metadata associated with the non-final pages based on the load state;
identifying the characteristics of the non-final pages based on the collected metadata.

9. The method of claim 8, wherein determining a load state comprises:
determining whether the load is an initial load or an incremental load.

10. A computer-based system for consolidating a database, comprising:
a hardware memory;
a hardware processor coupled to the memory via a bus; and
a load engine, wherein the load engine
identifies characteristics of non-final pages in the database in response to a database query,
triggers a phase of page consolidation based on the identified characteristics, wherein the triggers comprise: initiating a load phase for the non-final pages based on the identified characteristics, while allocating memory in the database for a plurality of persistent data structures used to store metadata associated with the non-final pages in the database, wherein initiating the load phase, the load engine:
determines row-identifier to region mappings for non-final page regions of the non-final pages,
determines overlapping row-identifier ranges between the non-final pages and additional non-final pages, and
stores the metadata in the plurality of persistent data structures, wherein a first data structure is utilized to store information related to overlapping non-final pages and a second data structure is utilized to store the row-identifier to the region mappings for the non-final page regions of the non-final pages; and
generates a final page in the database in response to the phase of page consolidation.

11. The computer-based system of claim 10, wherein the load engine identifies characteristics of non-final pages, the load engine
determines a fill factor for the non-final pages; and
determines a merge level for the non-final pages based on the determined fill factor.

12. The computer-based system of claim 11, wherein to trigger a phase of page consolidation, the load engine
determines when to trigger a merge phase based at least in part on the initiated load phase and the characteristics of the merge level.

13. The computer-based system of claim 11, wherein to determine a fill factor the load engine:
determines a last row identifier for the non-final pages;
determines a first row identifier for the non-final pages; and determines a level of compactness of the non-finals based on a comparison of the last row identifier, the first row identifier and a total number of rows of the non-final pages.

14. The computer-based system of claim 11, wherein to determine a merge level, the load engine:
    labels the non-final pages as a first merge level when the fill factor meets a first threshold;
    labels the non-final pages as a second merge level when the fill factor meets a second threshold; and
    labels the non-final pages as a third merge level when the fill factor meets a third threshold.

15. The computer-based system of claim 12, wherein to determine when to trigger a merge phase, the load engine performs a merge operation with the non-final pages when the load phase is an initial load; and
    determines a batch count for each merge level,
    determines a ratio of outstanding non-final pages,
    determines a merge mode based on the batch count and ratio of outstanding non-final pages, and
    performs a merge operation with the non-final pages based on the determined merge mode when the load phase is an incremental mode, wherein the merge mode determines a level of merging.

16. The computer-based system of claim 15, wherein to perform a merge operation, the load engine performs one of a partial merge and a complete merge with the non-final pages to generate final pages and intermediate pages.

17. The computer-based system of claim 10, wherein to initiate a load phase, the load engine identifies a load state of a load including the non-final pages;
    identifies metadata associated with the non-final pages based on the load state;
    identifies the characteristics of the non-final pages based on the collected metadata.

18. The computer-based system of claim 17, wherein to identify a load state, the load engine determines whether the load is an initial load or an incremental load.

19. A non-transitory computer program product comprising a tangible computer useable hardware medium including control logic stored therein, the control logic when executed by one or more processors causing the processor to perform operations for consolidating a database, the operations comprising:
    identifying characteristics of non-final pages in the database in response to a database query;
    triggering a phase of page consolidation based on the identified characteristics, wherein said triggering comprises:
        initiating a load phase for the non-final pages based on the identified characteristics, while allocating memory in the database for a plurality of persistent data structures used to store metadata associated with the non-final pages in the database, wherein initiating the load phase comprises:
            determining row-identifier to region mappings for non-final page regions of the non-final pages,
            determining overlapping row-identifier ranges between the non-final pages and additional non-final pages, and
            storing the metadata in the plurality of persistent data structures, wherein a first data structure is utilized to store information related to overlapping non-final pages and a second data structure is utilized to store the row-identifier to the region mappings for the non-final page regions of the non-final pages; and
    generating a final page in the database in response to the phase of page consolidation.

* * * * *